(12) United States Patent
Lutas et al.

(10) Patent No.: US 10,630,643 B2
(45) Date of Patent: Apr. 21, 2020

(54) DUAL MEMORY INTROSPECTION FOR SECURING MULTIPLE NETWORK ENDPOINTS

(71) Applicant: Bitdefender IPR Management Ltd., Nicosia (CY)

(72) Inventors: Dan H. Lutas, Cluj-Napoca (RO); Daniel I. Ticle, Turda (RO); Radu I. Ciocas, Cluj-Napoca (RO); Sandor Lukacs, Floresti (RO); Ionel C. Anichitei, Cluj-Napoca (RO)

(73) Assignee: Bitdefender IPR Management Ltd., Nicosia (CY)

( * ) Notice: Subject to any disclaimer, the term of this patent is extended or adjusted under 35 U.S.C. 154(b) by 127 days.

(21) Appl. No.: 15/383,082

(22) Filed: Dec. 19, 2016

(65) Prior Publication Data
US 2017/0180318 A1    Jun. 22, 2017

Related U.S. Application Data

(60) Provisional application No. 62/269,952, filed on Dec. 19, 2015.

(51) Int. Cl.
*G06F 21/00* (2013.01)
*H04L 29/06* (2006.01)
(Continued)

(52) U.S. Cl.
CPC ...... *H04L 63/0254* (2013.01); *G06F 9/45558* (2013.01); *G06F 9/542* (2013.01);
(Continued)

(58) Field of Classification Search
CPC . H04L 63/0254; H04L 63/14; H04L 63/0272; H04L 63/0245; G06F 21/568;
(Continued)

(56) References Cited

U.S. PATENT DOCUMENTS 7,797,748 B2    9/2010 Zheng et al.
7,979,260 B1 *  7/2011 Sobel ................... G06F 9/4416
                                                    703/13

(Continued)

FOREIGN PATENT DOCUMENTS

EP    1443379 A2    8/2004

OTHER PUBLICATIONS

European Patent Office (ISA), International Search Report and Written Opinion dated Mar. 1, 2017 for PCT International Application No. PCT/EP2016/081697, international filing date Dec. 19, 2016, priority date Dec. 19, 2015.

(Continued)

*Primary Examiner* — Kendall Dolly
*Assistant Examiner* — Kevin Ayala
(74) *Attorney, Agent, or Firm* — Law Office of Andrei D Popovici, PC

(57) ABSTRACT

In some embodiments, a protected client operates a live introspection engine and an on-demand introspection engine. The live introspection engine detects the occurrence of certain events within a protected virtual machine exposed on the respective client system, and communicates the occurrence to a remote security server. In turn, the server may request a forensic analysis of the event from the client system, by indicating a forensic tool to be executed by the client. Forensic tools may be stored in a central repository accessible to the client. In response to receiving the analysis request, the on-demand introspection engine may retrieve and execute the forensic tool, and communicate a result of the forensic analysis to the security server. The server may use the information to determine whether the respective client is under attack by malicious software or an intruder.

24 Claims, 8 Drawing Sheets

(51) Int. Cl.
*G06F 21/56* (2013.01)
*G06F 9/455* (2018.01)
*G06F 9/54* (2006.01)

(52) U.S. Cl.
CPC .......... *G06F 21/567* (2013.01); *G06F 21/568* (2013.01); *H04L 63/0245* (2013.01); *H04L 63/0272* (2013.01); *H04L 63/14* (2013.01); *G06F 2009/45587* (2013.01)

(58) Field of Classification Search
CPC .... G06F 21/567; G06F 9/45558; G06F 9/542; G06F 2009/45587
USPC .......................................................... 726/13
See application file for complete search history.

(56) References Cited

U.S. PATENT DOCUMENTS

| | | | |
|---|---|---|---|
| 8,312,261 B2 | 11/2012 | Rao et al. | |
| 8,443,363 B1* | 5/2013 | Brennan, III | G06F 9/45558 |
| | | | 711/147 |
| 8,601,583 B1* | 12/2013 | Chandrasekhar | G06F 21/54 |
| | | | 726/24 |
| 9,009,836 B1* | 4/2015 | Yarykin | G06F 9/45558 |
| | | | 726/24 |
| 9,608,909 B1* | 3/2017 | Bharadwaj | H04L 47/11 |
| 2005/0086523 A1 | 4/2005 | Zimmer et al. | |
| 2008/0320594 A1 | 12/2008 | Jiang | |
| 2010/0115621 A1* | 5/2010 | Staniford | H04L 63/1416 |
| | | | 726/25 |
| 2010/0122343 A1 | 5/2010 | Ghosh et al. | |
| 2010/0251363 A1* | 9/2010 | Todorovic | G06F 21/53 |
| | | | 726/22 |
| 2011/0004935 A1 | 1/2011 | Moffie et al. | |
| 2012/0144489 A1* | 6/2012 | Jarrett | G06F 21/566 |
| | | | 726/24 |
| 2012/0254993 A1* | 10/2012 | Sallam | G06F 21/53 |
| | | | 726/22 |
| 2013/0312096 A1 | 11/2013 | Larsen et al. | |
| 2014/0325656 A1 | 10/2014 | Sallam | |
| 2017/0124326 A1* | 5/2017 | Wailly | G06F 21/554 |

OTHER PUBLICATIONS

European Patent Office (ISA), International Preliminary Report and Written Opinion dated Jun. 28, 2018 for PCT International Application No. PCT/EP2016/081697, international filing date Dec. 19, 2016, priority date Dec. 19, 2015.

* cited by examiner

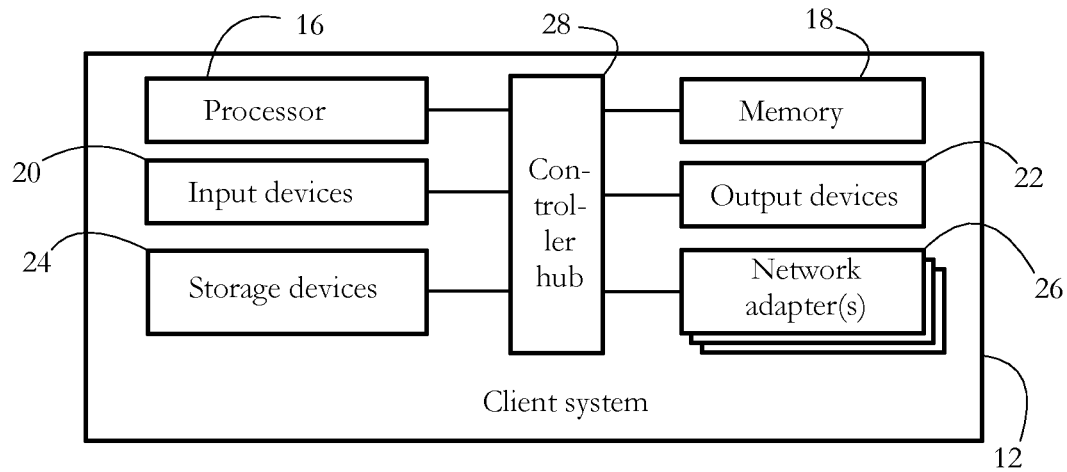
FIG. 2-A
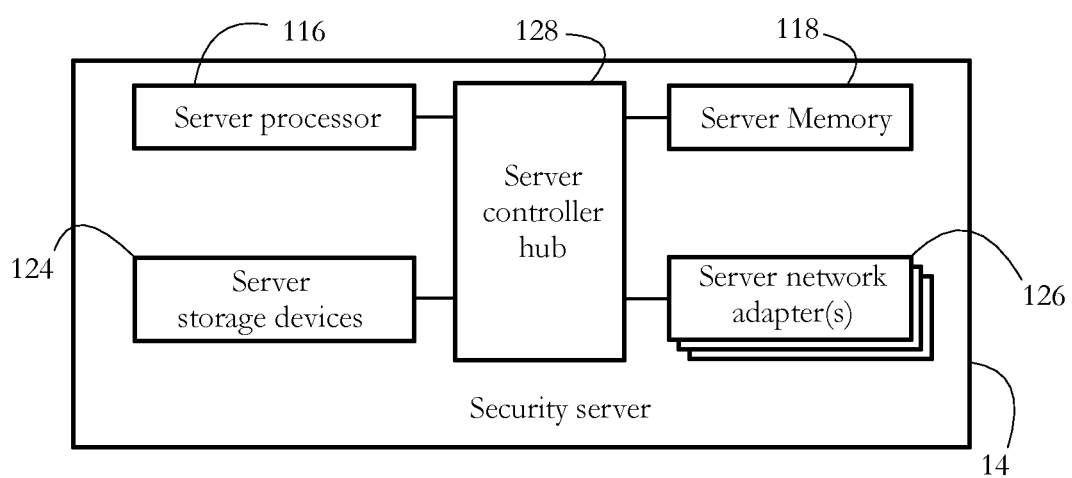
FIG. 2-B

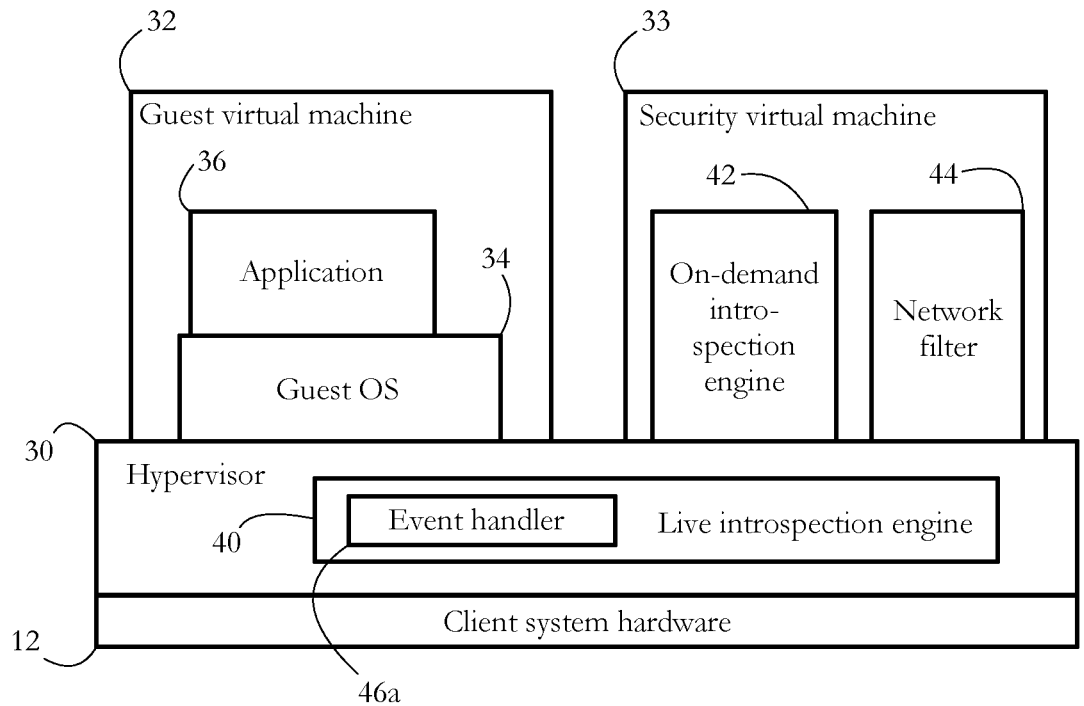
FIG. 3-A
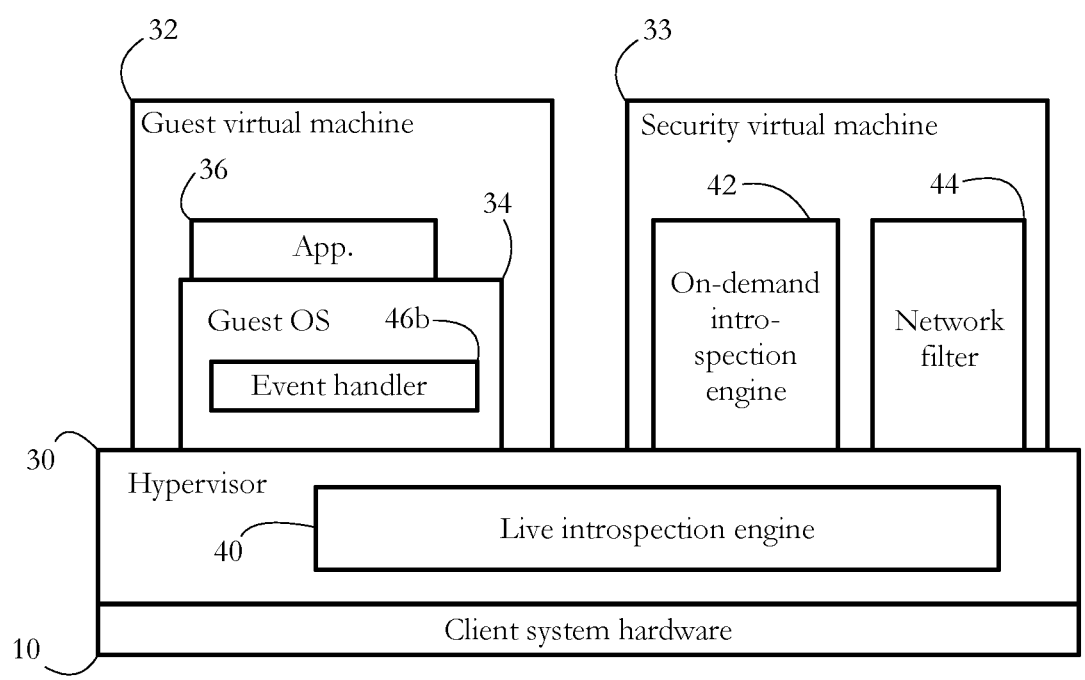
FIG. 3-B

DUAL MEMORY INTROSPECTION FOR SECURING MULTIPLE NETWORK ENDPOINTS

RELATED APPLICATIONS

This application claims the benefit of the filing date of U.S. provisional patent application No. 62/269,952, filed on Dec. 19, 2015, entitled "Dual Memory Introspection for Securing Multiple Network Endpoints," the entire contents of which are incorporated by reference herein.

BACKGROUND

The invention relates to computer security systems and methods, and in particular to systems and methods for protecting hardware virtualization environments from computer security threats.

Malicious software, also known as malware, affects a great number of computer systems worldwide. In its many forms, such as computer viruses, worms, rootkits, and spyware, malware presents a serious risk to millions of computer users, making them vulnerable to loss of data and sensitive information, identity theft, and loss of productivity, among others.

Computer security software may be used to protect computer systems from malicious software. However, in distributed computing systems such as corporate networks and cloud computing systems, conventional security software typically does not respond well to attacks. Even when the security software is capable of detecting an attack, analysis and remediation may still require that a human operator be dispatched to the affected client system, for instance to apply a patch, recover lost data, etc. In addition, once a new threat is detected and analyzed, updated versions of the security software must be distributed promptly to all protected computer systems.

An alternative computer security system may execute on a central server computer, receiving relevant data from security clients over a communication network. The server may determine according to the received data whether the respective client is infected with malware, and may communicate a verdict to the respective client. While such configurations are better equipped to deal with emerging threats, they require substantial server-side computational power.

Computer security operations were further complicated by the advent of hardware virtualization. As more and more goods and services are traded online, and as work becomes progressively de-localized, infrastructure as a service (IAAS) has become a viable alternative to owning computer hardware. A substantial proportion of computing activities are currently conducted using virtual machines. In typical applications, such as server farms and cloud computing, hundreds of virtual machines may execute concurrently on a single hardware platform. All such virtual machines may require malware protection.

Adapting to the ever-changing nature of malicious software and to the challenges of a mobile workforce requires the development of innovative computer security systems and protocols, and especially of systems and methods enabling an efficient management of computer security operations across multiple distributed clients.

SUMMARY

According to one aspect, a client computer system comprises a hardware processor configured to execute a hypervisor, a live introspection engine, and an on-demand introspection engine. The hypervisor is configured to expose a guest virtual machine (VM) and a security VM distinct from the guest VM, wherein the on-demand introspection engine executes within the security VM, and wherein the live introspection engine executes outside of the guest and security VMs. The live introspection engine is configured, in response to detecting an occurrence of an event within the guest VM, to transmit an indicator of the event to a remote server computer system over a communication network. The on-demand introspection engine is configured, in response to the live introspection engine transmitting the indicator of the event to the remote server computer system, to receive an analysis request from the remote server computer system, the analysis request indicating a security tool residing in a remote tool repository configured to distribute security tools to a plurality of clients including the client computer system, the security tool comprising software configured to analyze the occurrence of the event, the security tool selected by the remote server computer system according to an event type of the event. The on-demand introspection engine is further configured, in response to receiving the analysis request, to identify the security tool according to the analysis request, and in response, to selectively retrieve the security tool from the tool repository, wherein retrieving the security tool comprises connecting to the central tool repository over the communication network. The on-demand introspection engine is further configured, in response to selectively retrieving the security tool, to execute the security tool and to transmit a result of executing the security tool to the remote server computer system.

According to another aspect, a server computer is configured to perform computer security transactions with a plurality of client systems. The server computer system comprises a hardware processor configured, in response to receiving an event indicator from a client system of the plurality of client systems, the event indicator indicative of an occurrence of an event within a guest VM executing on the client system, to select a security tool residing in a remote tool repository configured to distribute security tools to the plurality of client systems, the security tool comprising software configured to analyze the occurrence of the event, wherein selecting the security tool is performed according to an event type of the event. The hardware processor is further configured, in response to selecting the security tool, to transmit an analysis request to the client system over a communication network, the analysis request comprising an identifier of the security tool; and in response, to receive from the client system a result of executing the security tool on the client system. The client system is configured to execute a hypervisor, a live introspection engine, and an on-demand introspection engine. The hypervisor is configured to expose the guest VM and a security VM distinct from the guest VM, wherein the on-demand introspection engine executes within the security VM, and wherein the live introspection engine executes outside of the guest and security VMs. The live introspection engine is configured, in response to detecting the occurrence of the event, to transmit the event indicator to the server computer system. The on-demand introspection engine is configured, in response to receiving the analysis request, to identify the security tool according to the analysis request. The on-demand introspection engine is further configured, in response to identifying the security tool, to selectively retrieve the security tool from the tool repository, wherein retrieving the security tool comprises the client system connecting to the remote tool repository over the communication network. The on-demand introspection engine is further configured, in response to retrieving the security tool, to execute the security tool to produce the result.

According to another aspect, a non-transitory computer-readable medium comprises a set of instructions which, when executed on a hardware processor of a client computer system, causes the client computer system to form a hypervisor, a live introspection engine, and an on-demand introspection engine. The hypervisor is configured to expose a guest virtual machine (VM) and a security VM distinct from the guest VM, wherein the on-demand introspection engine executes within the security VM, and wherein the live introspection engine executes outside of the guest and security VMs. The live introspection engine is configured, in response to detecting an occurrence of an event within the guest VM, to transmit an indicator of the event to a remote server computer system over a communication network. The on-demand introspection engine is configured, in response to the live introspection engine transmitting the indicator of the event to the remote server computer system, to receive an analysis request from the remote server computer system, the analysis request indicating a security tool residing in a remote tool repository configured to distribute security tools to a plurality of clients including the client computer system, the security tool comprising software configured to analyze the occurrence of the event, the security tool selected by the remote server computer system according to an event type of the event. The on-demand introspection engine is further configured, in response to receiving the analysis request, to identify the security tool according to the analysis request, and in response, to selectively retrieve the security tool from the tool repository, wherein retrieving the security tool comprises connecting to the central tool repository over the communication network. The on-demand introspection engine is further configured, in response to selectively retrieving the security tool, to execute the security tool and to transmit a result of executing the security tool to the remote server computer system.

BRIEF DESCRIPTION OF THE DRAWINGS

The foregoing aspects and advantages of the present invention will become better understood upon reading the following detailed description and upon reference to the drawings where:

FIG. 2-A illustrates an exemplary hardware configuration of a client system according to some embodiments of the present invention.

FIG. 2-B shows an exemplary hardware configuration of a security server computer system according to some embodiments of the present invention.

FIG. 3-A shows an exemplary set of virtual machines exposed by a hypervisor executing on a protected client system, and an exemplary pair of introspection engines according to some embodiments of the present invention.

FIG. 3-B shows an alternative configuration of security components according to some embodiments of the present invention.

DETAILED DESCRIPTION OF PREFERRED EMBODIMENTS

In the following description, it is understood that all recited connections between structures can be direct operative connections or indirect operative connections through intermediary structures. A set of elements includes one or more elements. Any recitation of an element is understood to refer to at least one element. A plurality of elements includes at least two elements. Unless otherwise required, any described method steps need not be necessarily performed in a particular illustrated order. A first element (e.g. data) derived from a second element encompasses a first element equal to the second element, as well as a first element generated by processing the second element and optionally other data. Making a determination or decision according to a parameter encompasses making the determination or decision according to the parameter and optionally according to other data. Unless otherwise specified, an indicator of some quantity/data may be the quantity/data itself, or an indicator different from the quantity/data itself. Computer security encompasses protecting users and equipment against unintended or unauthorized access to data and/or hardware, unintended or unauthorized modification of data and/or hardware, and destruction of data and/or hardware. A computer program is a sequence of processor instructions carrying out a task. Computer programs described in some embodiments of the present invention may be stand-alone software entities or sub-entities (e.g., subroutines, libraries) of other computer programs. Unless otherwise specified, guest software executes within a virtual machine. A program is said to execute within a virtual machine when it executes on a virtual processor of the respective virtual machine. Unless otherwise specified, a page represents the smallest unit of virtual memory that can be individually mapped to a physical memory of a host system. Unless otherwise specified, a snapshot of a client system comprises a copy of a content of a section of memory used by the respective client system. Computer readable media encompass non-transitory media such as magnetic, optic, and semiconductor storage media (e.g. hard drives, optical disks, flash memory, DRAM), as well as communication links such as conductive cables and fiber optic links. According to some embodiments, the present invention provides, inter alia, computer systems comprising hardware (e.g. one or more microprocessors) programmed to perform the methods described herein, as well as computer-readable media encoding instructions to perform the methods described herein.

The following description illustrates embodiments of the invention by way of example and not necessarily by way of limitation.

Figure 1:
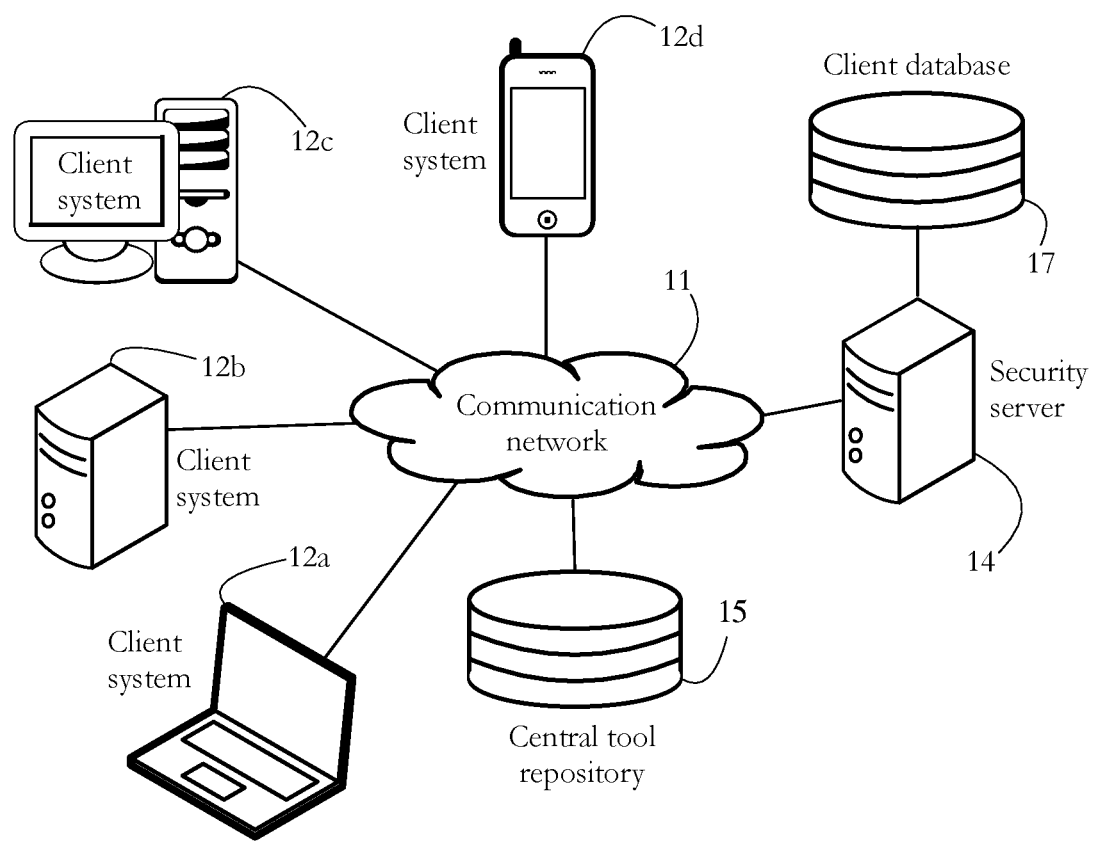
FIG. 1 illustrates an exemplary configuration wherein multiple client systems are protected against computer security threats according to some embodiments of the present invention.

FIG. 1 shows an exemplary configuration for protecting a plurality of client systems 12a-d against computer security threats according to some embodiments of the present invention. Exemplary client systems 12a-d include personal computer systems, mobile computing platforms (laptop computers, tablets, mobile telephones), entertainment devices (TVs, game consoles), wearable devices (smartwatches, fitness bands), household appliances, and any other electronic device comprising a processor and a memory and capable of operating a hardware virtualization platform. Another exemplary category of client systems includes datacenter servers and hardware virtualization platforms running cloud-based applications such as webservers and/or virtual desktop infrastructure.

Client systems 12a-d are interconnected via a communication network 11, such as a home network, corporate network, the Internet, etc. Network 11 includes at least one switch and/or router. Parts of network 11 may include a local area network (LAN) and/or a telecommunication network (e.g., 4G mobile telephony network, wireless LAN).

In some embodiments, a security server 14 is communicatively coupled to client systems 12a-d via network 11 and collaborates with client systems 12a-d to ward off computer security threats as described in detail below. Server 14 generically describes a set of interconnected computing systems, which may or may not be in physical proximity to each other. In some embodiments, server 14 is configured to receive event notifications from client systems 12a-d, and in response, to select according to a type of event a type of forensic analysis, a threat mitigation protocol, and/or a clean-up tool to be used by the respective client system. Exemplary forensic analyses include, for instance, obtaining specific data about a cause and/or a context of the respective event. Threat mitigation protocols may be selected according to a type of malicious software indicated by the respective event, and may include downloading and/or executing specific clean-up and/or damage control code on the respective client.

In some embodiments, security server 14 is further configured to interface with a client database 17. In an exemplary client database 17, each entry is associated with a protected client system 12a-d and/or with a virtual machine executing on the respective protected client system, and may include a log of trigger events and/or forensic reports (see below) reported by the respective client system/virtual machine. An exemplary entry of database 17 may further comprise system profile data (e.g., including OS version, installed applications, various settings, owner, contact information, etc.) for the respective client system/virtual machine. Another exemplary entry of client database 17 may comprise a set of parameter values representing a client-specific security policy associated with the respective client system. Such settings may be specified by a human operator, or may be set automatically according to a set of rules. In some embodiments of the present invention, client-specific policies and/or security setting vary dynamically in response to events occurring on the respective client, or on other protected clients.

In some embodiments, client systems 12a-d are further connected to a central tool repository 15 via network 11. Tool repository 15 may comprise a computer-readable medium or physical machine storing security tools and resources in the form of code (computer programs) and/or data. Client systems 12a-d may connect to repository 15 to selectively retrieve tools and data according to instructions received from security server 14, as shown in detail below. Tool repository 15 is available to multiple clients, so in a preferred embodiment of the present invention, repository 15 does not reside on any particular client system. Connecting to repository 15 therefore comprises transmitting and/or receiving communications to/from repository 15 via a network adapter of the respective client system. Such communications may traverse a network switch or router on the way.

Security tools stored in repository 15 may include forensic, anti-malware, and/or threat mitigation tools. Repository data may further comprise parameter values for configuring or tuning the respective tools according to a type of event under investigation, or according to local hardware/software configurations. Anti-malware tools enable detection of malicious software executing on the client systems 12a-d, and may include an encoding of a set of heuristic rules and/or a database of malware-identifying signatures. Threat mitigation tools may include clean-up tools programmed to remove or otherwise incapacitate a malicious software agent executing on a client system. Other exemplary threat mitigation tools are programmed to prevent an infected client system from transmitting malicious software to another client system, for instance by controlling the manner in which the infected client system uses its network adapter.

Forensic tools enable the analysis of security-related events occurring on client systems 12a-d. Some examples of forensic tools include snapshot-generating tools, programmed to obtain a memory snapshot of a client system or of a virtual machine executing on the respective client system. The snapshot may include memory data associated with an operating system (OS) or with another application currently executing on the respective client system. A snapshot of an OS kernel may include, among others, a copy of the kernel's code and data sections, various in-memory kernel drivers (code and/or data sections), in-memory kernel threads and their corresponding stacks, the OS's kernel data structures—such as the list of loaded modules, the list of processes, etc. An exemplary snapshot of an application comprises a copy of a memory image of the application, including its code and data sections, the in-memory stacks used by the application's threads, the heap memory pages of the respective application, etc.

In some embodiments, taking a memory snapshot comprises suspending execution of guest VM 32 to allow copying the content of the respective memory sections. An alternative embodiment performs "live" memory forensics without taking snapshots. In such embodiments, hypervisor 30 may map a set of physical memory pages used by guest VM 32 to virtual memory pages used by security VM 33. Security VM 33 may then inspect the content of the respective memory pages, for instance in response to a particular event, without having to suspend execution of guest VM 32 or to copy and transfer the respective content. One example of a "live" memory forensic tool is the Volatility® framework from the Volatility Foundation.

Another example of a forensic tool is an application inventory tool configured to enumerate software entities currently installed and/or executing on a client system. Yet another example of forensic tool is a configuration grabber programmed to obtain a set of configuration settings (e.g., current values of various OS parameters, hardware settings, security settings, firewall settings, etc.). Other exemplary forensic tools are programmed to gather system and/or application event logs, or system crash data (e.g. Windows® crash minidumps).

FIG. 2-A shows an exemplary hardware configuration of a client system 12, such as systems 12a-d in FIG. 1. For simplicity, the illustrated client system is a computer system; the hardware configuration of other client systems such as mobile telephones, watches, etc., may differ somewhat from the illustrated configuration. Client system 12 comprises a set of physical devices, including a hardware processor 16 and a memory unit 18. In some embodiments, processor 12 comprises a physical device (e.g. a microprocessor, a multi-core integrated circuit formed on a semiconductor substrate, etc.) configured to execute computational and/or logical operations with a set of signals and/or data. In some embodiments, such operations are delivered to processor 12 in the form of a sequence of processor instructions (e.g. machine code or other type of encoding). Memory unit 18 may comprise volatile computer-readable media (e.g. DRAM, SRAM) storing instructions and/or data accessed or generated by processor 16.

Depending on the type and performance of the device, client system 12 may further comprise a set of input devices 20, such as a keyboard, mouse, touchscreen, etc., enabling a user to input data and/or instructions to client system 12. A set of output devices 22, such as a monitor or liquid crystal display, may convey information to the user, e.g., via a graphical user interface. Storage devices 24 include computer-readable media enabling the non-volatile storage, reading, and writing of processor instructions and/or data. Exemplary storage devices 24 include magnetic and optical disks and flash memory devices, as well as removable media such as CD and/or DVD disks and drives. The set of network adapters 26 enables client system 12 to connect to communication network 11 and/or to other devices/computer systems. Controller hub 28 generically represents the plurality of system, peripheral, and/or chipset buses, and/or all other circuitry enabling the communication between processor 16 and devices 18, 20, 22, 24 and 26. For instance, controller hub 28 may include a memory management unit (MMU), an input/output (I/O) controller, and an interrupt controller, among others. In another example, controller hub 28 may comprise a northbridge connecting processor 16 to memory 18 and/or a southbridge connecting processor 16 to devices 20, 22, 24, and 26. In some embodiments, controller hub 28 may be integrated, in part or entirely, with processor 16, e.g., the MMU may share a common semiconductor substrate with processor 16.

FIG. 2-B shows an exemplary hardware configuration of security server 14. Server 14 comprises a hardware processor 116, a server memory 118, a set of server storage devices 124, and a set of network adapters 126, all connected by a server controller hub 128. The operation of devices 116, 118, 124, and 126 may mirror that of devices 16, 18, 24, and 26 described above. For instance, server processor 116 may comprise an integrated circuit configured to execute computational and/or logical operations with a set of signals and/or data. Server memory 118 may comprise non-transitory computer-readable media (e.g. RAM) storing data/signals accessed or generated by processor 116 while performing computations. Network adapters 126 enable security server 14 to connect to communication network 11.

In some embodiments, client system 12 is configured to expose a set of virtual machines, for instance as illustrated in FIGS. 3-A-B. A virtual machine (VM) emulates an actual physical machine/computer system, using any of a variety of techniques known in the art of hardware virtualization. In some exemplary configurations, a hypervisor 30 executes on client system 12, hypervisor 30 configured to create or enable a plurality of virtualized devices, such as a virtual processor and a virtual memory management unit, and to present such virtualized devices to software, to mimic the real, physical devices of client system 12. Such operations are commonly known in the art as exposing a virtual machine. Hypervisor 30 may further enable multiple virtual machines to share the hardware resources of host system 12, so that each VM may operate independently and be unaware of other VMs executing concurrently executing on client system 12. Examples of popular hypervisors include the VMware® vSphere® from VMware Inc. and the open-source Xen® hypervisor, among others.

In the exemplary configurations illustrated in FIGS. 3-A-B, a guest VM 32 executes a guest operating system 34 and an application 36. Although FIGS. 3-A-B show only one guest VM, in applications such as virtual desktop infrastructure (VDI) and server farming, client system 12 may execute multiple such VMs (e.g., hundreds) concurrently. Each guest VM includes at least one virtualized processor, and may further include other virtualized devices such virtualized input, output, storage, and network devices, as well as virtualized controller, among others. Each virtualized processor comprises an emulation of at least some of the functionality of hardware processor 16, and is configured to receive processor instructions for execution. Software using the virtual processor for execution is said to execute within the respective virtual machine. For instance, in the examples of FIGS. 3-A-B, guest OS 34 and application 36 are said to execute within guest VM 32. In contrast, hypervisor 30 is said to execute outside, or below, guest VM 32.

OS 34 provides an interface between application 36 and the virtualized hardware of guest VM 32. Operating system 34 may comprise any widely available operating system such as Microsoft Windows®, MacOS®, Linux®, iOS®, or Android®, among others. Application 36 generically represents any computer program such as word processing, image processing, media player, database, calendar, personal contact management, browser, gaming, voice communication, and data communication applications, among others.

In some embodiments, hypervisor 30 further exposes a security VM 33, which may execute concurrently with guest VM 32, protecting guest VM 32 against computer security threats such as malware and intrusion. A single security VM may protect multiple guest VMs executing on the respective client system. The virtual environments of guest VM 32 and security VM 33 may be isolated from each other to ensure that malicious software executing within guest VM 32 does not infect or otherwise interfere with software executing within security VM 33. For instance, virtual processors of security VM 33 are distinct from virtual processors of other virtual machines executing on client system 12; memory translations for security VM 33 and guest VM 32 use distinct sets of page tables. Security VM 33 may be configured to collaborate with security server 14 as shown in detail below. Some embodiments of security VM 33 comprise a lightweight, minimal operating system (e.g., a customized version of a Linux® OS), an on-demand introspection engine 42 and a network filter 44. In an alternative embodiment, network filter 44 executes outside security VM 33, for instance at the processor privilege level of hypervisor 30 (e.g., root level, ring −1).

In some embodiments, hypervisor 30 may expose only a subset of virtualized devices to guest VM 32, and may give security VM 33 direct and exclusive use of some hardware devices of client system 12. In one such example, guest VM 32 may have exclusive use of input devices 20 and output devices 22, but lack a virtualized network adapter. Meanwhile, security VM 33 may have direct and exclusive use of network adapter(s) 26. In one such embodiment, all communication to and/or from guest VM 32 is sent/received via security VM 33. Hypervisor 30 may actively route network packets between guest VM 32 and security VM 33 using a memory sharing mechanism, for instance. Security VM 33 may further use filter 44 to selectively allow or prevent communications between guest VM 32 and a remote party. Such configurations may be implemented, for instance, using VT-d® technology from Intel®.

In some embodiments, security software executing on client system 12 further comprises a live introspection engine 40 executing outside protected guest VM 32. The term "introspection" is hereby used to denote activities aimed at gathering information about software executing within a target VM from a position outside the respective VM. Examples of introspection include, among others, determining whether software executing within the respective VM performs certain actions (e.g., executing certain processor instructions, accessing certain hardware resources, using certain services of the OS, accessing certain memory locations, etc.) Other examples of introspection comprise determining memory addresses used by various software objects executing within the respective VM, and/or controlling access to a memory location indicated by such addresses.

Engine 40 may be incorporated into hypervisor 30, for instance as a library, or may be delivered as a computer program distinct and independent from hypervisor 30, but executing at the processor privilege level of hypervisor 30 (e.g., root mode, ring −1). In an alternative embodiment, live introspection engine may execute in a separate virtual machine distinct from guest VM 32. Engine 40 may be a process having a separate scheduled execution thread, or may operate as a collection of unscheduled code objects executing when triggered by certain events, as shown below.

Engine 40 is configured to monitor the behavior of a plurality of executable entities (e.g., processes, threads, applications). Such may comprise detecting the occurrence of various events during execution of the respective software, and selectively reporting such events to security server 14. Various types of events may be detected in this manner, for instance, calls to certain OS functions, system calls, etc. Other examples of detected events include an attempt to modify a function of OS 34 (a code manipulation commonly known in the art as code patching or hooking), an attempt by one software entity to inject code into another software entity, an attempt to launch a software component which is not digitally signed, and an attempt to circumvent a digital signature verification, among others. Other types of detected events may include opening a file, creating a file, writing to a file, deleting a file, copying a file, creating a process, terminating a process, scheduling a thread for execution, suspending a thread because of a synchronization event (e.g. mutual exclusion), creating a heap, allocating memory from heap, extending the size of an execution stack, changing a memory access permission, performing a swap-in (e.g. disk-to-memory) operation, performing a swap-out (e.g. memory-to-disk) operation, loading an executable module (e.g., shared library—DLL), opening a registry key, renaming a registry key, detecting the attachment of a new hardware device, establishing a new network connection, receiving a network packet, raising the execution privileges of a thread, and changing the discretionary access control (DAC) permission associated with a file.

Several methods for detecting such events are known in the art. They include hooking certain OS functions, modifying dispatch tables, etc. In hardware virtualization platforms, a special category of methods for detecting security-relevant events relies on detecting a violation of a memory access permission. Most modern computer systems are configured to operate with virtual memory and to manage memory address translations using dedicated data structures, for instance page tables. Systems configured to support hardware virtualization typically use a second layer of address translations, from a guest-physical memory seen by each exposed VM to the actual physical memory 18 of client system 12. The second address translation is typically achieved using hardware-accelerated, dedicated data structures and mechanisms controlled by processor 16, known as second level address translation (SLAT). Popular SLAT implementations include extended page tables (EPT) on Intel® platforms, and rapid virtualization indexing (RVI)/nested page tables (NPT) on AMD® platforms. SLAT typically allows setting memory access permissions for each memory page, such as read/write/execute.

In some embodiments, live introspection engine 40 collaborates with hypervisor 30 to set access permissions of certain memory pages using a SLAT mechanism as described above. In one such example, a particular memory page hosts code belonging to a particular OS function. Marking the respective page as non-executable will trigger a permission violation when an attempt is made to execute the respective OS function. The violation may be interpreted by introspection engine 40 as an indicator that an attempt to execute the respective OS function has occurred.

Processor 16 may be configured to trigger a processor event (e.g., an exception, fault, etc.) when software attempts to access the respective page in a manner that violates the current access permissions. One type of processor event comprises a VM exit event (VMExit on Intel® platforms), wherein processor 16 switches from executing code within the respective VM to executing a handler routine outside the respective VM in response to a violation of a memory access permission. Another category of processor events comprises a virtualization exception (# VE on Intel® platforms), wherein processor 16 switches to executing a handler routine within the respective VM.

In the exemplary configuration of FIG. 3-A, an event handler 46a executes outside the monitored guest VM, at the processor privilege level of hypervisor 30. Such embodiments may rely on VM exit events to inform live introspection engine 40 about the occurrence of an event within guest VM 32. In contrast, in FIG. 3-B, an event handler 46b executes within the monitored VM, for instance, at the processor privilege level of guest OS 34 (e.g., ring 0, kernel mode). Such configurations may rely on virtualization exceptions to detect in-VM events. Handler 46b may use an inter-process communication mechanism (e.g., using a shared section of memory) to send event information to introspection engine 40. Configurations as shown in FIG. 3-B may be more efficient at information gathering than those shown in FIG. 3-A, since handler 46b executes within the monitored VM and therefore can use functions and mechanisms of guest OS 34 to determine the semantics of each detected event. However, by executing within guest VM 32, handler 46b may be more vulnerable to malicious software than handler 46a.

Instead of relying on just live introspection engine 40 or on software executing within the protected VM to analyze security events, some embodiments of the present invention further deploy a second, on-demand introspection engine 42. Live introspection engine 40 may detect the occurrence of various events within the monitored guest VM, but may not carry out a sophisticated forensic analysis of such events, since such an analysis would be too computationally costly and would negatively impact user experience. Instead, on-demand introspection engine 42 may be invoked to perform the respective forensic analysis, but such forensic analysis may be selectively triggered only for a subset of events detected by live introspection engine 40. In some embodiments, the decision to perform a forensic analysis of an event is taken by security server 14 and communicated to the respective client system 12.

In some embodiments, live introspection engine 40 and on-demand introspection engine 42 may communicate with each other, for instance via a shared section of memory and signaling carried out via hypervisor 30. For instance, while performing forensic activities, on-demand introspection engine 42 may read and use the current state of live introspection engine 40. In turn, live introspection engine may receive notifications from on-demand introspection engine, for instance to signal that forensic activities are currently being carried out.

Figure 4:
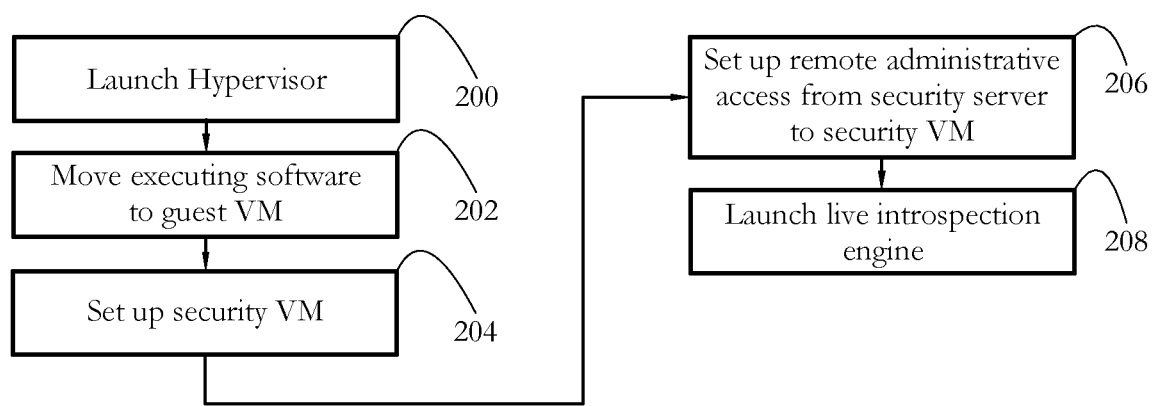
FIG. 4 shows an exemplary sequence of steps carried out by an installer application to set up computer security on a client system according to some embodiments of the present invention.

FIG. 4 shows an exemplary sequence of steps performed to set up computer security on client system 12 according to some embodiments of the present invention. In a typical scenario of protecting a corporate network against computer security threats, a network administrator may install a security application on each client system 12a-d that requires protection. The security application may comprise various components, such as hypervisor 30, introspection engines 40-42, event handlers 46a-b, etc. The illustrated sequence of steps may be carried out, for instance, by an installer utility of the respective security application. When installed in the absence of a hardware virtualization environment, security software may first take over processor 16 at the strongest processor privilege level (e.g., root mode, ring −1), and install hypervisor 30. Hypervisor 30 may then expose guest VM 32 and move all software previously executing on the respective client system to execute within guest VM 32. Hypervisor 30 may further set up security VM 33 and configure a method of sharing the hardware of the respective client system between VMs 32-33. The installer may then install and launch software executing within security VM 33, as well as live introspection engine 40.

In some embodiments, hypervisor 30 and/or security VM 33 may be launched using a secure boot mechanism or another form of authentication known in the art, to ensure that security VM 33 executes trusted software. Setting up security VM 33 (step 204) and/or other software executing within security VM 33 may comprise authentication exchanges (e.g., hash verification) with security server 14 or with other authentication entities. In one exemplary embodiment, the secure boot may employ a secure storage hardware component of client system 12, such as a Trusted Platform Module (TPM) on Intel® platforms, and further employ an integrity attestation mechanism such as Intel®'s Trusted Execution Technology (TXT).

Figure 5:
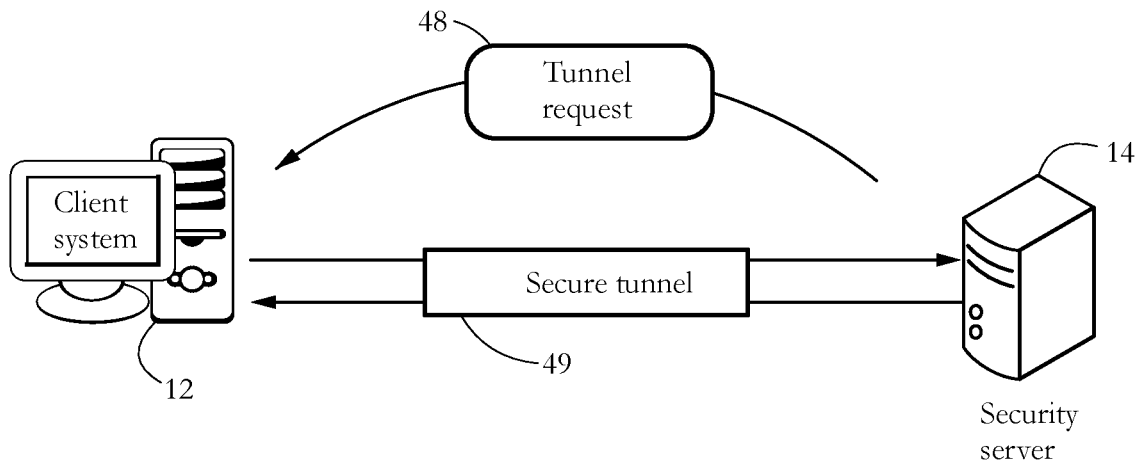
FIG. 5 shows configuring a virtual private network (VPN) secure connection between a client system and the security server according to some embodiments of the present invention.

In some embodiments, a step 206 sets up a remote administrative access from security server 14 to security VM 33. Such access may enable security server 14 (automatically or assisted by a human operator) to send instructions and commands directly to a protected client system, for instance to instruct on-demand introspection engine 42 to perform a particular kind of forensic analysis, or to carry out a specific sequence of clean-up steps. Setting up remote administrative access may include, for instance, setting up a tunnel (i.e., a point-to-point secure communication channel) between server 14 and security VM 33 via secure shell (SSH) or virtual private network (VPN) protocols. FIG. 5 shows such an exemplary exchange. A tunnel request 48 may be issued by either client system 12 or server 14. Request 48 may comprise an indicator of an exchange protocol, and a set of encryption keys. In response, the communicating parties set up a secure tunnel 49 comprising a specific manner of encrypting and routing network packets between them. In some embodiments, hypervisor 30 routes network packets received from security server 14 directly to security VM 33.

Figure 6:
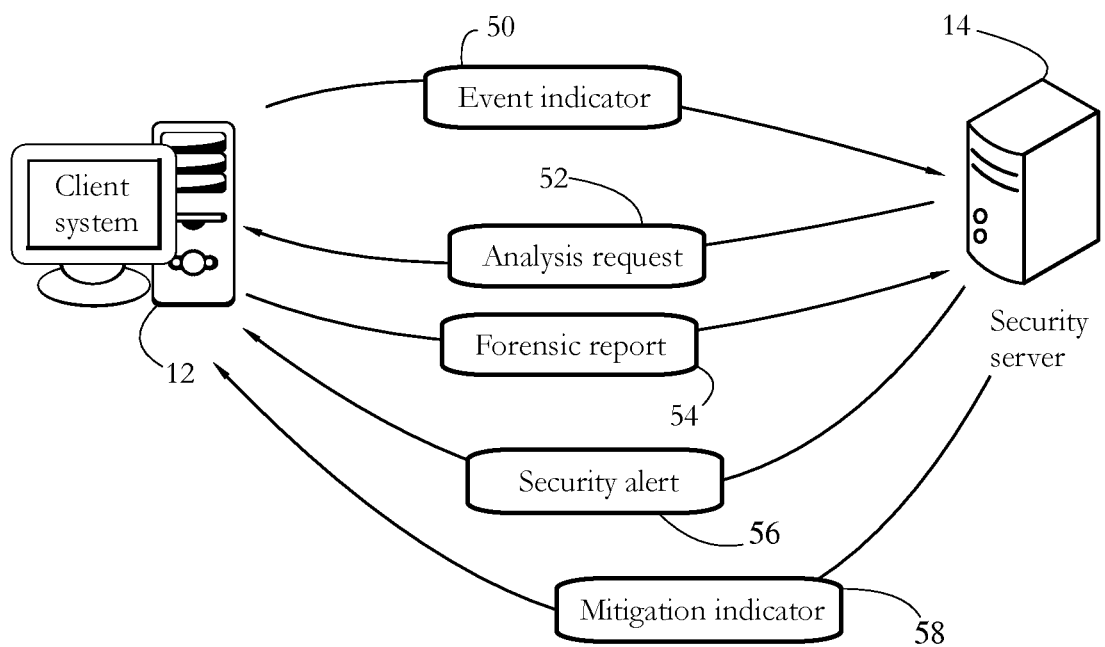
FIG. 6 shows an exemplary data exchange between a client system and the security server, the exchange occurring during malware detection according to some embodiments of the present invention.

FIG. 6 shows an exemplary data exchange between security server 14 and a protected client system according to some embodiments of the present invention. Client system 12 may send an event indicator 50 to inform server 14 that an event has occurred during execution of software within guest VM 32. Event indicator 50 may include an indicator of an event type of the respective event, a timestamp of the event, and an identifier (client ID) of the respective client system 12 and/or guest VM 32.

In response, server 14 may send an analysis request 52 to client system 12, request 52 instructing on-demand introspection engine 42 to perform certain forensic activities on client system 12. Analysis request 52 may include an indicator of a forensic tool to be used by engine 42 to carry out data gathering/event analysis, and/or an indicator of some other kind of security resource. In some embodiments, an analysis request 52 may be sent out to a client system in response to receiving an event indicator from another client system.

In some embodiments, in response to performing the requested forensic activities, on-demand introspection engine 42 transmits a forensic report 54 to server 14, report 54 comprising a result of carrying out the respective forensic activities. Report 54 may include, for instance, a list of software objects, a list of memory addresses, a list of security or hardware settings, etc.

In response to receiving forensic report 54, server 14 may determine whether the respective client system/guest VM is vulnerable to a particular kind of computer security threat, for instance, whether the respective client system/guest VM is infected with malicious software. When yes, server 14 may transmit a security alert 56 to the respective client system 12. Some embodiments of server 14 further transmit a mitigation indicator 58 comprising, for instance, an indicator of a clean-up tool, or a set of parameter values for configuring network filter 44.

Figure 7:
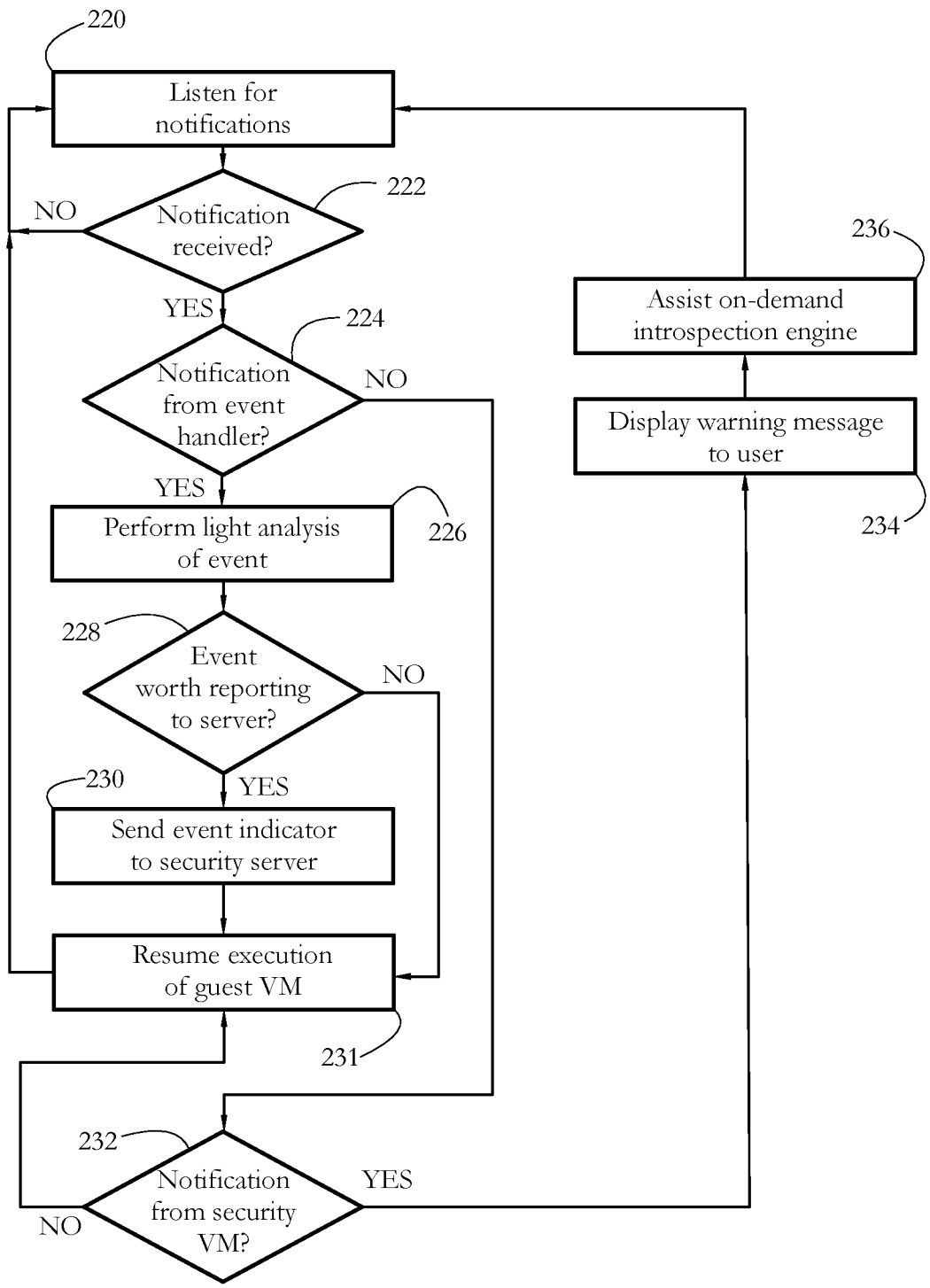
FIG. 7 shows an exemplary sequence of steps performed by the live introspection engine according to some embodiments of the present invention.

FIG. 7 shows an exemplary sequence of steps performed by live introspection engine 40 according to some embodiments of the present invention. Engine 40 may be configured to listen for at least two kinds of messages/notifications: notifications from event handlers 46a-b about the occurrence of an event within guest VM 32, and notifications from security VM 33 (for instance, from on-demand introspection engine 42, to signal to engine 40 that forensic activities are currently taking place). When receiving event notifications, in a step 226, engine 40 may perform a preliminary analysis of such event notifications. In some embodiments, such preliminary analyses carry minimal computational costs, to keep the impact on user experience as low as possible. For instance, step 226 may filter event notifications using a relatively simple set of rules. Only certain kinds of events may be reported to security server 14 (steps 228-230). In one exemplary embodiment, events that are communicated to security server 14 include, among others, an attempt to hook or patch the OS kernel, an injection of an unknown module, and an attempt to execute code from a particular memory region. In response to the analysis of the event, in a step 231 some embodiments of engine 40 instruct hypervisor 30 to resume execution of guest VM 32. Resuming execution may include configuring processor 16 to emulate the respective event. For instance, when the event comprises execution of a particular processor instruction, step 231 may comprise emulating the respective instruction (e.g., writing a result of executing the respective processor instruction to a virtual register of the virtual processor of guest VM 32).

When the detected event comprises a notification from security VM 33 (step 232), some embodiments may display a warning message on an output device of client system 12, for instance to inform a user that client system 12 may experience a temporary slowdown due to ongoing forensic or threat mitigation activities. In a further step 236, some embodiments of live introspection engine 40 may collaborate with and assist on-demand introspection engine 42 to carry out forensic/mitigation activities. An example of such collaboration includes on-demand introspection engine 42 interrogating the current state of live introspection engine 40.

Figure 8:
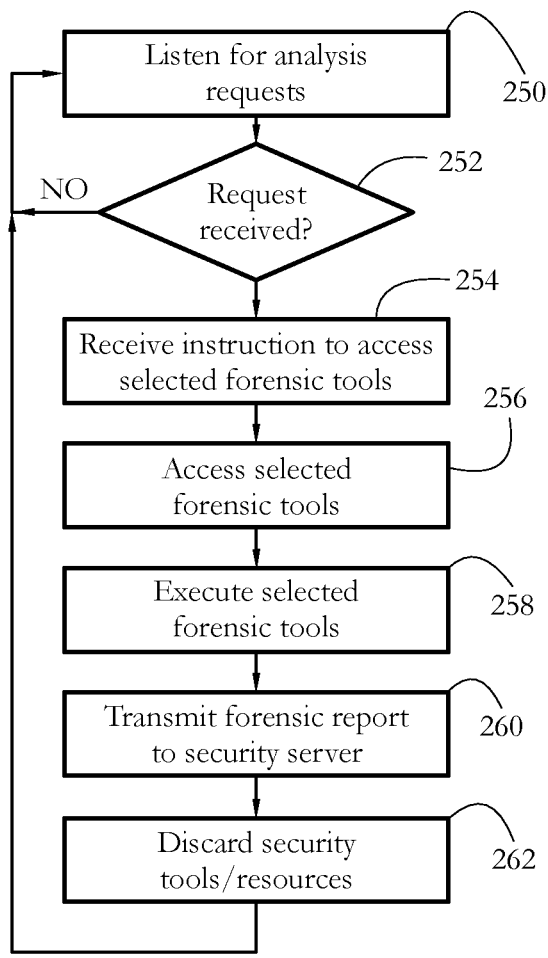
FIG. 8 shows an exemplary sequence of steps performed by the on-demand introspection engine according to some embodiments of the present invention.

FIG. 8 shows an exemplary sequence of steps performed by on-demand introspection engine 42 according to some embodiments of the present invention. In a sequence of steps 250-252, engine 42 may listen for analysis requests from server 14, for instance via secure tunnel 49 established between server 14 and security VM 33 (see FIG. 5). In some embodiments, hypervisor 30 may automatically switch from executing guest VM 32 to executing security VM 33 and on-demand introspection engine 42 in response to receiving analysis request 52.

Request 52 may indicate a set of tools and/or security resources to be used in forensic activities. For instance, analysis request 52 may include a location indicator (e.g., memory address, network path) that allows the selective retrieval of the respective tools from tool repository 15. In a step 256, engine 42 may access such tools/resources over communication network 11. Accessing a tool/resource may comprise downloading the respective tool/resource from tool repository 15 onto local storage devices 24 of client system 12 (FIG. 2-A). In a preferred embodiment, accessing a tool/resource comprises on-demand engine 42 mounting the respective tools/resources from their remote location. Mounting herein refers to creating a connection between the remote resource (hosted by tool repository 15) and a local file system of security VM 33 so that security VM 33 can access the respective resource via the local file system. For instance, in a Linux® file system, mounting is achieved via the "mount" command, and the said connection comprises a mount point.

In some embodiments, server 14 may explicitly instruct engine 42 via tunnel 49 to access and/or mount the respective tools/resources. In response to accessing the tools/resources, in a sequence of steps 258-260-262, engine 42 may carry out the requested forensic activities, send forensic report 54 to server 14, and unmount or otherwise discard the respective tools/resources. Discarding the tools/resources at the end of the forensic analysis may be beneficial in that it does prevent propagation of malicious software between distinct sessions of forensic analysis, and that it ensures that client systems 12*a-c* always use the latest version of the respective resource available in tool repository 15.

Figure 9:
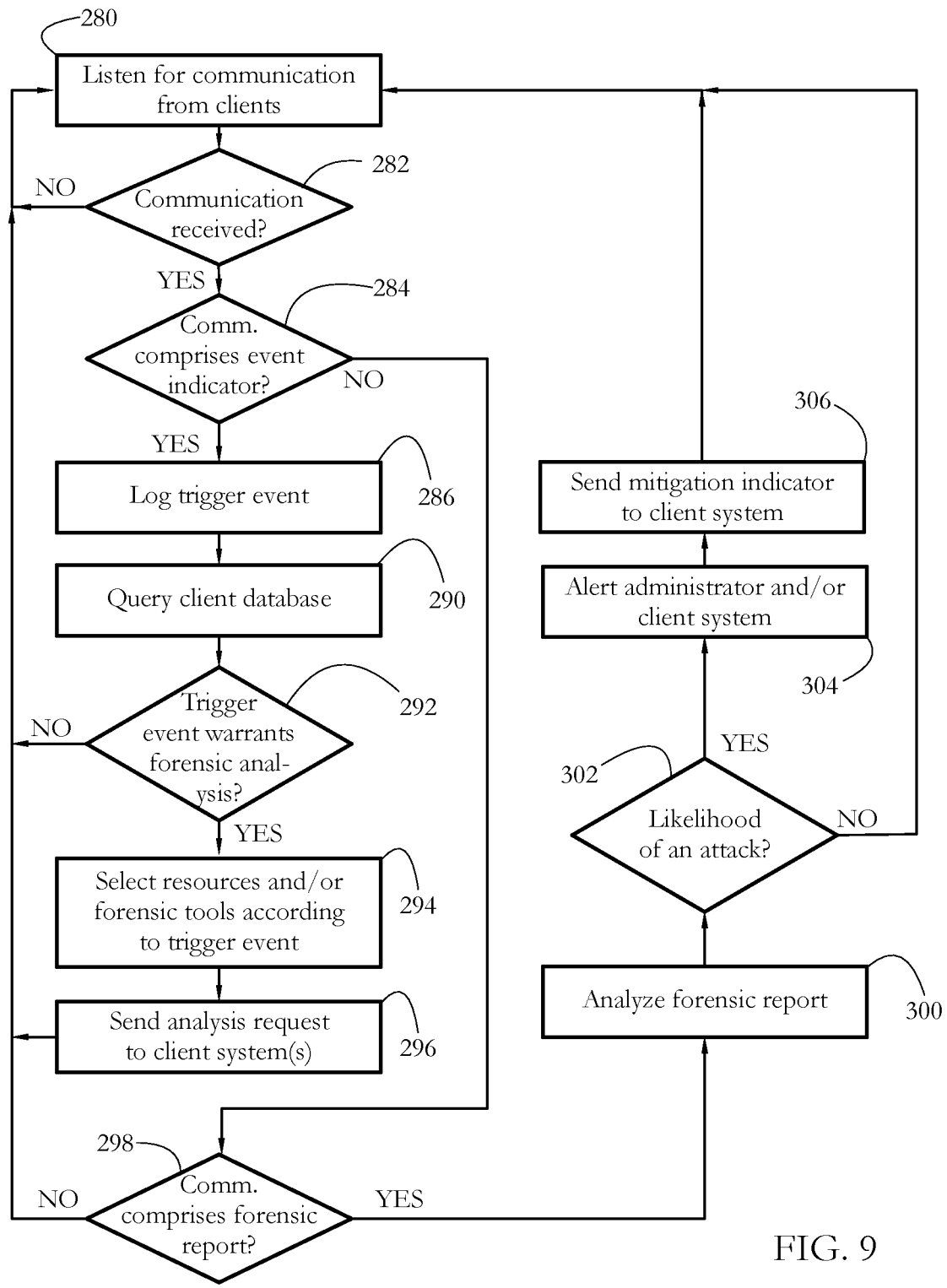
FIG. 9 illustrates an exemplary sequence of steps performed by the security server according to some embodiments of the present invention.

FIG. 9 shows an exemplary sequence of steps performed by security server 14 according to some embodiments of the present invention. Server 14 may be configured to listen for communications received from client systems 12*a-d* (steps 280-282). When such a communication comprises an event indicator (i.e., a notification that an event has occurred on a protected client system), some embodiments log the respective event (step 286), and determine according to event indicator 50 whether to request a forensic analysis, and what kind of analysis to request. In one such example, when event indicator 50 shows that a code injection has occurred, server 14 may request an analysis using the "application snapshot" and/or Volatility® memory forensic tools. In some embodiments, certain types of events generate requests for complex analyses, using multiple tools and resources.

The decision may be taken according to an event type indicated by the current notification, and/or according to a security policy currently in effect for the respective client system/guest VM. The decision process may therefore include querying client database 17 for the event history and/or client-specific policy (step 290). Other decision criteria may include a hardware configuration of the respective client system (e.g., whether client system 12 has specific hardware components, like a particular kind of processor, network adapter, etc.). Other criteria may comprise software aspects, such as a type of operating system executing within guest VM 32, and a type of application 36 (webserver, database processing, etc.). Such decision strategies rely on knowledge that some software is vulnerable to particular computer security threats. The decision process may employ a set of heuristic rules, a decision tree, or any other means known in the art. One exemplary embodiment may use an artificial neural network receiving data such as the event type and various policy feature values as input, and outputting a decision indicator (e.g., YES/NO) showing whether to request a forensic analysis or not.

In some embodiments, a decision whether to request a forensic analysis and/or what type of analysis to request may further consider a history of events occurring on the same client system. Such embodiments allow correlating events occurring at distinct moments in time, and as such, may allow detection of sophisticated malware which distribute a malicious payload over a multitude of software entities (for instance, some actions are performed by a first entity, and other actions by a child entity of the first entity, or by a second entity which contains code injected by the first entity).

In some embodiments, the decision process may consider a history of events occurring on client systems distinct from the sender of event notification 50. In one such example, server 14 may query an event log for information about whether a specific type of event has recently occurred on other client systems. A burst of such activity may signal a wave of malware that is spreading among client systems (zero-day threat), or a coordinated attack carried out by multiple client systems.

When the notified event warrants a forensic analysis (step 292), a step 294 selects resources and/or forensic tools to be used by the respective client system to carry out the required forensic analysis. The selection may be done according to a set of rules, a decision tree, etc. In one example, in response to receiving a notification that a code injection has occurred, server 14 may request an analysis using the "application snapshot" tool. In some embodiments, certain types of events generate requests for complex analyses, using multiple tools and resources.

When the communication received from client system 12 comprises forensic report 54 (step 298), server 14 may analyze the respective report (step 300) and possibly corroborate report 54 with other reports from the same or from other client systems, and determine whether any of client systems 12*a-c* is vulnerable to a computer security threat (e.g., likely under attack by a malicious entity). When yes, server 14 may send a warning to the administrator and/or security alert 56 to the affected client system. In a further step 306, server 14 may send mitigation indicator 58 to the respective client system, for instance via secure tunnel 49. Mitigation indicator 58 may include commands, instructions, and/or an indicator of a set of clean-up tools.

In the exemplary embodiments described above (FIGS. 7-8-9), decisions concerning whether to request a forensic analysis and/or what type of analysis to request are taken by security server 14. In an alternative embodiment, on-demand introspection engine 42 receives analysis request 52 and event indicator 50 directly from live introspection engine 40, for instance via an inter-process communication mechanism managed by hypervisor 30. On-demand introspection engine 42 may then select a set of forensic tools/resources to use according to event indicator 50 and/or other criteria as described above. In such embodiments, the decision to access (e.g., mount) the respective resources is therefore taken at the protected client system.

Some embodiments of the present invention further strengthen computer security by employing network filter 44 to regulate communication between client system 12 and security server 14 or between client system 12 and other entities connected to communication network 11. In one example, security VM 33 may be configured to have exclusive use of network adapter(s) 26 of client system 12. Hypervisor 30 may then route all communication to/from guest VM 32 via security VM 33's network filter 44. In some embodiments, when server 14 determines that client system 12 is vulnerable or likely to be under attack by a malicious entity, server 14 may instruct network filter 44 to block all communication to/from guest VM 32, to prevent guest VM 32 from connecting to other client systems over the local network, or to prevent guest VM 32 from accessing the Internet. In an alternative embodiment, network filter 44 may block or otherwise regulate communication between guest VM 32 and another entity while on-demand introspection engine 42 performs forensic activities.

Some embodiments of the present invention allow protecting a relatively large number of client systems (e.g., a corporate network) against computer security threats such as malware, spyware, adware, and unauthorized intrusion. Some embodiments may further allow for an easy and trustworthy management of security from a central point, for instance from a security server communicatively coupled with the protected client systems. Such centralization may be particularly advantageous for cloud computing applications such as webserver farming and virtual desktop infrastructure management, wherein hundreds of virtual machines may operate simultaneously on a single hardware platform.

In some embodiments, each protected client operates a live introspection engine and an on-demand introspection engine. The live introspection engine detects the occurrence of certain events within a protected virtual machine exposed on the respective client system and communicates the occurrence to a remote security server. In turn, the server may select a forensic tool from a tool repository according to the event type of the reported event, and/or according to hardware and/or software particularities of the respective client. The on-demand introspection engine may retrieve the forensic tool and execute it to perform a forensic analysis of the event (e.g., to uncover a context of the respective event). A result of the forensic analysis may then be communicated to the security server, which may use the information to determine whether the respective client is under attack by malicious software or an intruder.

Some embodiments of the present invention rely on the insight that typical computer security solutions for protecting a large number of clients do not respond well to attacks. Even when the existing solutions are capable of detecting the attack, analysis and remediation may require that a human operator be dispatched to the affected client system, especially in the case of sophisticated threats such as ransomware and malicious intrusion. In contrast, in some embodiments of the present invention, customized data gathering/fact finding (forensic analysis) and threat mitigation (e.g., malware cleanup) is performed automatically on the client machine, under direct instruction of the security server. One exemplary embodiment of the present invention establishes a secure point-to-point communication channel between a protected client and the security server, which allows a human operator to remotely configure the respective client, and even conduct forensics/cleanup operations on the respective client from a remote terminal.

By aggregating event detection and forensic analysis results from multiple clients, some embodiments may allow a rapid detection of previously unknown malware (also known in the art as zero-day attacks). Conventional server-side threat detection typically requires substantial server-side computing power. In contrast to typical client-server detection scenarios, in some embodiments of the present invention some costly security-related operations such as event filtering and forensic analysis are carried out by the client system itself. Some embodiments therefore use the distributed computing power of multiple client machines to perform some costly threat-detection and analysis operations, instead of offloading most of the computational burden to the security server.

Some embodiments of the present invention further rely on the observation that not all events occurring in a computer system are intrinsically informative or indicative of a computer security threat. The same type of event (e.g., accessing a URL, opening a disk file, etc.) may indicate malice in some scenarios, while being completely benign in other scenarios. In one such example, an event may not be indicative of malice when taken in isolation, but may be malware-indicative when it occurs as part of a specific sequence of events. For instance, writing to a disk file may be a benign operation when taken in isolation (i.e., a lot of processes and applications access the disk legitimately). However, the write event may be suspicious when the entity performing the writing is the recipient of code injected from another entity. In some embodiments of the present invention, the live introspection engine pre-filters detected events according to various criteria, and only reports a selected subset of such events to the security server. This strategy further reduces the computational burden placed on the server.

In conventional computer security applications, client-side security tools (e.g., anti-malware routines, signature databases, etc.) reside on the client computer system, and are kept up to date by periodic software updates. In contrast, in some embodiments of the present invention, security tools are kept in a centralized repository (e.g., dedicated server on a corporate network). Client systems may retrieve only the tools that are needed, on demand, when instructed by the security server, thus eliminating the need for bulky software updates and time-consuming network administration. In a preferred embodiment, client systems remotely access security tools by mounting the remote centralized tool repository onto a file system of the client.

Keeping the majority of the security tools in a central repository, as opposed to the protected client or security server, ensures that clients have access to the most recent version of the respective security tools. Another significant advantage of such configurations is that they allow client- and server-side software to be substantially smaller than in conventional security systems. Such lightweight components (e.g., hypervisor 30, live- and on-demand introspection engines 40-42) are easier to develop, maintain, and deploy to clients. They also require fewer updates than all-in-one security solutions which include forensic and/or threat mitigation tools. In addition, lightweight components expose a relatively smaller attack surface to malicious software and hackers.

In preferred embodiments, the on-demand introspection engine executes within a dedicated virtual machine, separate from the protected guest VM. Beside the increased security, such configurations have other important advantages, for instance ease of deployment and increased portability. Executing a security tool within a virtual machine may allow a developer to deploy a single version of the respective tool to all protected client systems, and further allows using relatively sophisticated development environments and/or frameworks such as Python® or .Net®, for instance. In one such exemplary embodiment, all security VMs may be uniformly configured to run the Linux® OS and a set of Python® libraries, while forensic/threat mitigation tools may be developed in Python®. In a contrasting an alternative embodiment, the on-demand introspection engine may execute at the processor privilege level of hypervisor 30, e.g., alongside or integrated with live introspection engine 40. However, in such configurations, the on-demand introspection engine and/or security tools may need to be coded/compiled/tested specifically for the hardware and/or software particularities of the respective client system, which may substantially impact the development costs and time-to-market of security software.

Another advantage of executing on-demand introspection engine 42 separately from live introspection engine 40 (e.g., in a separate virtual machine) is that in such configurations engine 42 may execute concurrently with the protected guest VM. In typical conventional security solutions, execution of the protected virtual machine is suspended for the duration of event analysis (memory forensics, etc.). In contrast, in some embodiments of the present invention, the analysis of an event is performed offline, i.e., while the protected virtual machine continues execution. Such configurations reduce the impact of computer security operations, creating a better user experience.

It will be clear to one skilled in the art that the above embodiments may be altered in many ways without departing from the scope of the invention. Accordingly, the scope of the invention should be determined by the following claims and their legal equivalents.

What is claimed is:

1. A client computer system comprising at least one hardware processor configured to execute a hypervisor, a live introspection engine, and an on-demand introspection engine, wherein:
   the hypervisor is configured to expose a guest virtual machine (VM) and a security VM distinct from the guest VM;
   the live introspection engine executes outside of the guest and security VMs at a processor privilege level of the hypervisor and is configured to:
      detect a violation of an access permission defined for a section of a memory of the client computer system, the section used by the guest VM,
      in response, infer an occurrence of an event within the guest VM according to the violation, and
      transmit an indicator of the event to a remote server computer system over a communication network; and
   the on-demand introspection engine executes within the security VM and is configured to:
      in response to the live introspection engine transmitting the indicator of the event to the remote server computer system, receive an analysis request from the remote server computer system, the analysis request indicating a security tool residing in a remote tool repository configured to distribute security tools to a plurality of clients including the client computer system, the security tool configured to collect malware-indicative data, the security tool selected by the remote server computer system according to an event type of the event,
      in response to receiving the analysis request, selectively retrieve the security tool from the tool repository, the security tool identified according to the analysis request, wherein retrieving the security tool comprises connecting to the central tool repository over the communication network,
      in response to selectively retrieving the security tool, execute the security tool, wherein executing the security tool 5 comprises identifying another section of the memory of the client computer system, the other section used by the guest VM, and determining the malware-indicative data according to a content of the other section,
      in response to executing the security tool, transmit the malware-indicative data to the remote server computer system,
      in response to transmitting the malware-indicative data to the remote server computer system, receive from the remote server computer system an indicator of a mitigation tool residing in the remote tool repository, the mitigation tool comprising software configured to incapacitate malicious software executing on the client computer system, and
      in response to receiving the indicator of the mitigation tool, retrieve and execute the mitigation tool.

2. The client computer system of claim 1, wherein the live introspection engine is further configured to:
   in response to detecting the violation, determine an event type of the event according to the violation;
   determine according to the event type whether an event eligibility condition is satisfied; and
   in response, transmit the indicator of the event to the remote server computer system only when the event eligibility condition is satisfied.

3. The client computer system of claim 1, wherein retrieving the security tool from the remote tool repository comprises mounting the remote tool repository onto a file system of the security VM.

4. The client computer system of claim 1, wherein the security VM further comprises a network filter, wherein the hypervisor is further configured to route network traffic between the guest VM and a remote party via the network filter, and wherein the network filter is configured, in response to receiving a security alert from the remote server computer system, to restrict network traffic between the guest VM and the remote party.

5. The client computer system of claim 1, wherein the malware indicative data comprises a memory snapshot of an application executing within the guest VM and/or a memory snapshot of a kernel of an operating system of the guest VM.

6. The client computer system of claim 1, wherein the malware indicative data comprises a list of software entities executing within the guest VM.

7. The client computer system of claim 1, wherein the malware indicative data comprises an indicator of a hardware configuration of the client computer system.

8. The client computer system of claim 1, wherein:
the hypervisor is configured to establish a secure point-to-point communication channel between the remote server computer system and the security VM; and
the on-demand introspection engine is configured to receive the analysis request and transmit the malware-indicative data via the secure point-to-point communication channel.

9. The client computer system of claim 1, wherein the security VM further comprises a network filter, wherein the hypervisor is further configured to route network traffic between the guest VM and a remote party via the network filter, and wherein the network filter is configured, in response to the analysis request, to restrict network traffic between the guest VM and the remote party for a duration of execution of the security tool.

10. The client computer system of claim 1, wherein the on-demand introspection engine is further configured to:
in response to executing the security tool, remove the security tool from the memory of the client computer system;
in response to removing the security tool, receive another analysis request from the server computer system, the other analysis request indicating another security tool from the tool repository;
in response to receiving the other analysis request, selectively retrieve the other tool from the tool repository;
in response to retrieving the other security tool, execute the security tool to determine another set of malware-indicative data; and
transmit the other set of malware-indicative data to the server computer system.

11. The client computer system of claim 1, wherein the at least one hardware processor is further configured, in response to receiving the analysis request, to display a notification on an output device of the client computer system, the notification indicating a temporary slowdown of the guest VM.

12. The client computer system of claim 1, wherein the event consists of an item selected from a group comprising a code injection, a memory allocation, a loading of a library, a launch of a process, and a change of a memory access permission.

13. A non-transitory computer-readable medium comprising a set of instructions which, when executed on a hardware processor of a client computer system, causes the client computer system to form a hypervisor, a live introspection engine, and an on-demand introspection engine, wherein:
the hypervisor is configured to expose a guest virtual machine (VM) and a security VM distinct from the guest VM;
the live introspection engine executes outside of the guest and security VMs at a processor privilege level of the hypervisor and is configured to:
detect a violation of an access permission defined for a section of a memory of the client computer system, the section used by the guest VM,
in response, infer an occurrence of an event within the guest VM according to the attempt, and
transmit an indicator of the event to a remote server computer system over a communication network; and
the on-demand introspection engine executes within the security VM and is configured to:
in response to the live introspection engine transmitting the indicator of the event to the remote server computer system, receive an analysis request from the remote server computer system, the analysis request indicating a security tool residing in a remote tool repository configured to distribute security tools to a plurality of clients including the client computer system, the security tool configured to collect malware-indicative data, the security tool selected by the remote server computer system according to an event type of the event,
in response to receiving the analysis request, selectively retrieve the security tool from the tool repository, the security tool identified according to the analysis request, wherein retrieving the security tool comprises connecting to the central tool repository over the communication network,
in response to selectively retrieving the security tool, execute the security tool, wherein executing the security tool comprises identifying another section of the memory of the client system, the other section used by the guest VM, and determining the malware-indicative data according to a content of the other section,
in response to executing the security tool, transmit the malware-indicative data to the remote server computer system
in response to transmitting the malware-indicative data to the remote server computer system, receive from the remote server computer system an indicator of a mitigation tool residing in the remote tool repository, the mitigation tool comprising software configured to incapacitate malicious software executing on the client computer system, and
in response to receiving the indicator of the mitigation tool, retrieve and execute the mitigation tool.

14. A computer security method comprising employing at least one hardware processor of a client computer system to execute a hypervisor, a live introspection engine, and an on-demand introspection engine, wherein:
the hypervisor is configured to expose a guest virtual machine (VM) and a security VM distinct from the guest VM;
the live introspection engine executes outside of the guest and security VMs at a processor privilege level of the hypervisor;
the on-demand introspection engine executes within the security VM;
wherein executing the live introspection engine comprises:
detecting a violation of an access permission defined for a section of a memory of the client computer system, the section used by the guest VM,
in response, inferring an occurrence of an event within the guest VM according to the violation, and
transmitting an indicator of the event to a remote server computer system over a communication network; and
wherein executing the on-demand introspection engine comprises:
in response to the live introspection engine transmitting the indicator of the event to the remote server computer system, receiving an analysis request from the remote server computer system, the analysis request indicating a security tool residing in a remote tool repository configured to distribute security tools to a plurality of clients including the client computer system, the security tool configured to collect malware-indicative data, the security tool selected by the remote server computer system according to an event type of the event, in response to receiving the analysis request, selectively retrieving the security tool from the tool repository, the security tool identified according to the analysis request, wherein retrieving the security tool comprises connecting to the central tool repository over the communication network, in response to selectively retrieving the security tool, executing the security tool, wherein executing the security tool comprises identifying another section of the memory of the client computer system, the other section used by the guest VM, and determining the malware-indicative data according to a content of the other section, in response to executing the security tool, transmitting the malware-indicative data to the remote server computer system, in response to transmitting the malware-indicative data to the remote server computer system, receiving from the remote server computer system an indicator of a mitigation tool residing in the remote tool repository, the mitigation tool comprising software configured to incapacitate malicious software executing on the client computer system, and in response to receiving the indicator of the mitigation tool, retrieving and executing the mitigation tool.

15. The method of claim 14, wherein executing the live introspection engine further comprises:

in response to detecting the violation, determining an event type of the event according to the violation;

determining according to the event type whether an event eligibility condition is satisfied; and in response, transmitting the indicator of the event to the remote server computer system only when the event eligibility condition is satisfied.

16. The method of claim 14, wherein retrieving the security tool from the remote tool repository comprises mounting the remote tool repository onto a file system of the security VM.

17. The method of claim 14, wherein the security VM further comprises a network filter, wherein the hypervisor is further configured to route network traffic between the guest VM and a remote party via the network filter, and wherein executing the on-demand introspection engine further comprises, in response to receiving a security alert from the remote server computer system, employing the network filter to restrict network traffic between the guest VM and the remote party.

18. The method of claim 14, wherein the malware-indicative data comprises a memory snapshot of an application executing within the guest VM and/or a memory snapshot of a kernel of an operating system of the guest VM.

19. The method of claim 14, wherein the malware-indicative data comprises a list of software entities executing within the guest VM.

20. The method of claim 14, wherein the malware-indicative data comprises an indicator of a hardware configuration of the client computer system.

21. The method of claim 14, wherein the security VM further comprises a network filter, wherein the hypervisor is further configured to route network traffic between the guest VM and a remote party via the network filter, and wherein executing the on-demand introspection engine further comprises, in response to receiving the analysis request, employing the network filter to restrict network traffic between the guest VM and the remote party for a duration of execution of the security tool.

22. The method of claim 14, wherein executing the on-demand introspection engine further comprises:

in response to executing the security tool, removing the security tool from the memory of the client computer system;

in response to removing the security tool, receiving another analysis request from the server computer system, the other analysis request indicating another security tool from the tool repository;

in response to receiving the other analysis request, selectively retrieving the other tool from the tool repository;

in response to retrieving the other security tool, executing the security tool to determine another set of malware-indicative data; and transmitting the other set of malware-indicative data to the server computer system.

23. The method of claim 14, wherein executing the on-demand introspection engine further comprises, in response to receiving the analysis request, displaying a notification on an output device of the client computer system, the notification indicating a temporary slowdown of the guest VM.

24. The method of claim 14, wherein the event consists of an item selected from a group comprising a code injection, a memory allocation, a loading of a library, a launch of a process, and a change of a memory access permission.

* * * * *